UNITED STATES PATENT OFFICE.

WALTER S. LANDIS, OF NEW YORK, N. Y., ASSIGNOR TO AMERICAN CYANAMID COMPANY, OF NEW YORK, N. Y., A CORPORATION OF MAINE.

CYANID COMPOUND AND PROCESS OF PRODUCING THE SAME.

1,359,257.    Specification of Letters Patent.    Patented Nov. 16, 1920.

No Drawing.    Application filed January 16, 1920. Serial No. 351,976.

*To all whom it may concern:*

Be it known that I, WALTER S. LANDIS, a citizen of the United States, residing at New York, in the county of New York and State of New York, have invented certain new and useful Improvements in Cyanid Compounds and Processes of Producing the Same; and I do hereby declare the following to be a full, clear, and exact description of the invention, such as will enable others skilled in the art to which it appertains to make and use the same.

This invention relates to cyanid compounds and processes of producing the same from lime nitrogen or crude calcium cyanamid and has for its object to improve the products as well as the methods heretofore proposed.

With these and other objects in view the invention consists in the novel compounds containing large percentages of cyanids constituting the products, and in the steps and combinations of steps constituting the process, all as will be more fully hereinafter disclosed and particularly pointed out in the claims.

In order that the precise invention may be the more clearly understood, it is said:

It has been heretofore proposed to make sodium cyanid by melting sodium chlorid, adding thereto lime nitrogen and carbon preferably in the form of an alkaline earth metal carbid, and maintaining the bath thus produced above its melting point until the reaction is complete, all as is disclosed in the U. S. Letters Patent to Hal Pond Eastman, Number 1,282,395, dated October 22, 1918.

In the U. S. Letters Patent No. 1,277,900, to Horace Freeman, dated Sept. 3, 1918, it has been further proposed to first mix the sodium chlorid, lime nitrogen, and carbon, and then charge them into a continuous melting furnace. In this latter process the product is said to be sodium cyanid, and the proportions of reagents used are essentially those called for in the equation:

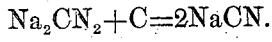

$$Na_2CN_2 + C = 2NaCN.$$

In carrying out this said last named process, however, it has been found necessary in the production of the sodium cyanid from the lime nitrogen or crude calcium cyanamid, to employ more sodium chlorid in the charge than is represented by the sodium cyanid formed.

I have discovered, on the other hand, that such an excess is not necessary; and that nitrogen can even be fixed in the form of a cyanid compound without the addition of sodium chlorid at all, and by merely heating lime nitrogen alone to a requisite high temperature, say 1300° C. or higher, and rapidly cooling it to below 400° C. I have further made many tons of a crude cyanid with a deficiency of sodium chlorid below that theoretically required to form sodium cyanid from the combined nitrogen present in the lime nitrogen.

For example, I have charged into a furnace mixtures made up of 200 pounds of lime nitrogen, 160 pounds of sodium chlorid, and 10 pounds of calcium carbid, and after rapidly heating up said charges to the required temperature, tapping them from the furnace, and cooling the same, I have found the products to contain an average cyanid content, which, calculated as sodium cyanid, would be equivalent to 37.3 per cent. of that compound.

I have, also, fused mixtures of 200 pounds of lime nitrogen, 130 pounds of sodium chlorid, and 10 pounds of calcium carbid in the same way as before, and obtained products with a cyanid content equivalent to 39.7 per cent. of sodium cyanid.

I again further reduced the salt content by using a mixture of 200 pounds of lime nitrogen, 100 pounds of sodium chlorid, and 10 pounds of calcium carbid, and obtained a product with a cyanid content equivalent to 44.5 per cent. reckoned as sodium cyanid.

In each of the test runs it will be seen I obtained more cyanid than could be accounted for by assuming it to all be present in the form of sodium cyanid. In fact, in the last case where I employed 200 pounds of lime nitrogen to 100 pounds of salt, and 10 pounds of calcium carbid, I even obtained 1.7 times as much cyanid as could be formed from the sodium in the sodium chlorid used if said sodium had been completely transferred into sodium cyanid.

These experiments carried out on a large scale to full capacity of the commercial units producing this material, led to a detailed study of the reaction involved. In a long series of experiments under careful laboratory control I succeeded in making cyanid compounds from lime nitrogen and sodium chlorid mixtures in any proportions of lime nitrogen to salt from say, substantially zero of lime nitrogen to one of salt, and from one of lime nitrogen to zero of salt.

In fact, I found that under the conditions of this process involving a rapid heating of the charge up to the reacting temperature, and a rapid cooling of the product, the sodium chlorid of the prior art could be displaced by other fusible compounds or fluxes as for example soda ash.

Similarly, I found many other alkali and alkaline earth metal compounds can be used as fluxes without appreciably altering the character of the reaction. These fluxes may be such compounds as the potassium halids, silicates of the alkali metals, halogen salts of the alkaline earth metals, cyanids and similar compounds.

I further discovered that while rapid heating is necessary to obtain a highly efficient reaction with the nitrogen, it is not necessary in all cases to reach final temperatures above the melting points of all of the constituents of the charge in order to form cyanid compounds. For instance, in the case of mixtures of soda ash, lime nitrogen, and calcium carbid, a cyanid was formed at temperatures 100° C. below the melting point of the soda ash.

I have further found from experimental and also from large scale work that the carbid addition in the charge could be materially reduced below that thought necessary in previous practice. When the quantity of flux added in the charge is reduced and the same quantity of power consumed in the furnace, I find that larger quantities of material can be handled by the furnace. The quantity of material handled by the furnace and consequently the rate of smelting of the charge is then increased because of the reduced smelting burden on the furnace occasioned by the reduced amount of flux. By increasing the rate at which the mixture passes through the furnace, and consequently reducing the time required to bring the charge up to the reacting temperature, the quantity of carbid addition to prevent foaming is reduced. In regular operation said carbid addition was found, when the charge is rapidly heated to the reacting temperature, to be only one-quarter of that called for in the preferred charge of the process, as disclosed in U. S. Patent No. 1,277,900. As the added carbid is reduced the residual carbid in the product is naturally decreased. This is greatly to be desired in either the extraction of precious metals, or for the production of hydrocyanic acid, or for any of the other various uses to which a cyanid product is put, because when the crude cyanid is dissolved in water any carbid present evolves acetylene gas which is an undesirable material in the respective industries.

I have further found in carrying out this invention, an alkaline earth metal carbid such as $CaC_2$ to be the only form of carbon to be added to the charge to insure smooth running of the furnace, and I believe its function is to absorb the nitrogen evolved during the rapid fusion of the mixture. This carbid may in part or all be derived from the residual carbid in the lime nitrogen.

In case the product of this process contains large percentages of calcium cyanid and is used where it is desired to have a substantial quantity of sodium present to carry out a desired reaction, I have found that it is quite easy to add the required sodium in the form of a suitable sodium salt. For example, if the reaction is carried on in a water solution, and it is desired to get rid of the calcium present, sodium carbonate or sodium sulfate may be added, whereupon an insoluble calcium carbonate or a sulfate will be precipitated and may then be removed by filtration.

In carrying out my new process, in practice, I may prepare, for example, a mixture of lime nitrogen or crude calcium cyanamid, common salt NaCl, and calcium carbid in such proportions as will insure the desired grade of the finished product. I then charge this mixture into a properly designed and regulated furnace where it is rapidly fused and tapped practically continuously from the furnace. The product upon tapping is immediately chilled to say below 300° C. or 400° C. and packed for shipment.

It is well known that crude calcium cyanamid contains calcium oxid CaO, and this, in the finished product serves to furnish what is known as "protective alkalinity" when said product is employed, for example in the refining of gold and silver. This protective alkalinity prevents the loss of the valuable cyanid by hydrolysis and consequently the evolution of HCN gas. This said calcium oxid is also of use in the manufacture of various prussiates, where ferrous sulfate is employed to convert the cyanids to prussiates. With the calcium oxid present in such cases, the sulfate combines with the calcium of the lime to form an insoluble calcium sulfate, which precipitates out, and leaves the desired compound uncontaminated. Again, the sodium chlorid used as a fluxing material has a decided advantage when appearing in the finished product when using the latter for the manufacture of yellow prussiate of sodium. Otherwise one would have to add sufficient sodium chlorid to furnish the sodium ions, required for the reaction. With the products of this invention, on the other hand, these sodium ions are already present in the form of sodium chlorid, which was previously used in the process, and therefore, it is not necessary, as has been the case heretofore, to add an excess of sodium chlorid in order to cause the reaction to proceed in the right direction.

Now if I desire to produce a grade of product such as is at present used in large quantities containing a cyanid compound equivalent to 36.5 per cent sodium cyanid, I proportion the mixture as follows, 200 parts of lime nitrogen, 180 parts of common salt, and 5 parts of calcium carbid. To prepare a crude cyanid compound containing an equivalent of 45 per cent. sodium cyanid, I employ a mixture containing 200 parts of lime nitrogen, 100 parts of common salt and 7 parts or less of calcium carbid. In the production of a crude cyanid containing an equivalent of 50 per cent. sodium cyanid I employ a mixture of substantially 200 parts lime nitrogen, 45 parts of common salt, and 9 parts or less of calcium carbid. In this manner by decreasing the sodium chlorid, I am able to produce a crude cyanid compound of any equivalent sodium cyanid content up to and over 50 per cent. As before mentioned the carbid addition may be made directly as such or in greater or less part as the residual carbid in the lime nitrogen.

Another example of carrying out this invention may be found in the following procedure:—I may mix 1000 pounds of lime nitrogen or crude calcium cyanamid with between 200 pounds and 1000 pounds of sodium chlorid and with less than 100 pounds of calcium carbid, and I may then rapidly heat said mixture to a temperature above 1300° C., remove the mass from the furnace and rapidly cool it to below 400° C. whereupon all the below stated advantages will be obtained.

It will be observed that this process differs essentially from the process disclosed in the U. S. Patent #1282405, dated Oct. 22, 1918, to Freeman, in that in this invention I increase the percentage of cyanid produced while decreasing the proportion of sodium chlorid employed.

I also differ from Freeman in that I use other fluxes than sodium chlorid. That is to say, a large percentage of the product of this invention, in many cases, cannot be sodium cyanid derived from sodium chlorid and lime nitrogen at all, as in the Freeman patent, for there are not enough sodium ions in such cases derived from the relatively small quantity of sodium chlorid used to produce the total quantity of cyanid that results from the procedure constituting this invention; and when other fluxes containing no sodium chlorid are used it follows as a matter of course, that the quantity of said ions derived from sodium chlorid will be zero, and that therefore, there is the widest difference between the said Freeman disclosure and that of this invention.

At present, I am not sure of the exact composition of my product but I believe when produced under many conditions, it consists largely of calcium cyanid, and if this be true, my invention for the first time discloses a method of producing abnormally high percentages of this compound from crude calcium cyanamid. It certainly discloses, in any case, for the first time, a procedure by which abnormally large percentages of cyanids of some kind are had.

Some of the advantages of my new process over the prior art reside in:

First, a lessened smelting burden on the furnace and consequently a lessened power consumption for a given cyanid product:

Second, a material decrease in raw material, namely, salt and carbid:

Third, a lessened requirement of metallic containers for the product because of the increased cyanid content:

Fourth, a decreased transportation requirement because of the lessened content of inert material;

And, finally, a cyanid product more to be desired in the industries because of the reduced handling and storage requirements.

It is obvious that those skilled in the art may vary the details of the process, without departing from the spirit of the invention, and I, therefore, do not wish to be limited to the above disclosure except as may be required by the claims.

What I claim is:—

1. The process of producing a cyanid compound which consists in providing a mixture containing crude calcium cyanamid, an alkaline earth metal carbid and a flux, said flux containing a less quantity of sodium ions combined with chlorin than is required to satisfy all the cyanogen ions to be formed; heating said mixture to form the desired cyanid and immediately cooling the product below 400° C., substantially as described.

2. The process of producing cyanid compounds which consists in melting a mixture of crude calcium cyanamid, a flux and an alkali earth metal carbid, said flux containing a less quantity of sodium ions combined with chlorin than is necessary to satisfy all the cyanogen ions to be formed; and rapidly heating the mixture to a temperature above that at which the reaction begins to take place, substantially as described.

3. The process of producing a product containing a large percentage of calcium cyanid which consists in fusing a mixture of lime nitrogen, calcium carbid and a flux, containing an alkali metal chlorid, said chlorid containing a less quantity of sodium ions than is required to combine with all the cyanogen ions to be formed; and rapidly raising the temperature of said mixture to produce a crude calcium cyanid, substantially as described.

4. The process of producing a crude calcium cyanid compound which consists in melting a mixture of lime nitrogen, calcium carbid, and a flux, containing sodium chlorid, said chlorid having a less quantity of sodium ions than is required to combine with all the cyanogen ions to be formed; heating said mixture to a temperature necessary for the formation of said calcium cyanid compound; and rapidly cooling the melted mass, substantially as described.

5. The process of producing a crude calcium cyanid which consists in rapidly heating to 1300° C. a mixture of calcium carbid, a flux, and lime nitrogen, or crude calcium cyanamid, and rapidly cooling the heated mixture to a temperature as low as 400° C., substantially as described.

6. The process of making calcium cyanid consisting in mixing 1000 parts of lime nitrogen with less than 1000 parts of sodium chlorid and with less than 100 parts of calcium carbid, and rapidly heating said mixture to a temperature above 1300° C.; removing the fused mass from the furnace, and quickly cooling the same to below 400° C., substantially as described.

7. The herein described crude cyanid compound containing a large percentage of calcium cyanid mixed with fluxing materials and with calcium oxid, substantially as described.

8. The herein described composition of matter containing more than 33 per cent. of calcium cyanid mixed with fluxing material and calcium oxid, substantially as described.

9. The herein described composition of matter containing more than 40 per cent. of calcium cyanid mixed with sodium chlorid and calcium oxid, substantially as described.

10. The herein described composition of matter containing more than 47 per cent. of calcium cyanid mixed with sodium chlorid and calcium oxid, substantially as described.

In testimony whereof I affix my signature.

WALTER S. LANDIS.